United States Patent [19]

Tomofuji et al.

[11] Patent Number: 4,533,987
[45] Date of Patent: Aug. 6, 1985

[54] POWER SUPPLY SYSTEM

[75] Inventors: Yoshiaki Tomofuji, Osaka; Takayoshi Maeda, Hirakata, both of Japan

[73] Assignee: Matsushita Electric Works, Ltd., Kadoma, Japan

[21] Appl. No.: 440,425

[22] Filed: Nov. 9, 1982

[30] Foreign Application Priority Data

Nov. 11, 1981 [JP] Japan ................................ 56-180679

[51] Int. Cl.³ ............................................ H02M 5/453
[52] U.S. Cl. ............................................ 363/36; 363/72
[58] Field of Search .......................... 363/34, 36, 37, 38, 363/39, 44, 67, 68, 148, 151, 71, 72

[56] References Cited

U.S. PATENT DOCUMENTS 3,614,461 10/1971 Speer ...................................... 363/34
3,697,717 10/1972 Kornrumpf et al. ................... 363/71

Primary Examiner—William H. Beha, Jr.
Assistant Examiner—Jeffrey Sterrett
Attorney, Agent, or Firm—Stevens, Davis, Miller & Mosher

[57] ABSTRACT

A power supply system is disclosed in which each of the phases of a three phase AC source are rectified and inverted. During inversion high frequency signals are obtained corresponding to the phases of the AC source which are synchronized so that their zero cross points occur at the same time. The high frequency signals are superposed in series to produce an output signal for a load which has a constant power and diminished current distortion.

2 Claims, 8 Drawing Figures

POWER SUPPLY SYSTEM

BACKGROUND OF THE INVENTION

The present invention relates to a power supply system utilizing a 3 phase power source in which line current distortion is diminished.

FIG. 1 illustrates a circuit of a conventional power supply system and FIG. 2 wave forms at respective portions thereof. Referring to FIG. 1, with a full wave rectifying bridge consisting of diodes $D_1 \ldots D_6$ linked to a 3 phase power source, the AC voltages are converted into a DC voltage $V_{DC}$ and, then this DC voltage is introduced into an inverter 2 for inversion into a high frequency wave, which is applied to a load 3.

FIG. 3 shows an exemplary circuit of the inverter 2, in which an oscillator circuit is composed of transistors Q1 and Q2 and a transformer T. The load 3, comprises any equipment which utilizes AC power, e.g., motor, etc. In some instances, the RPM of the motor is controlled by altering the oscillation frequency or output voltage of the inverter 2. For equipment which uses DC power, the inverter 2 may be omitted. In such a power supply system, since the 3 phase alternating currents at the input are subjected to full wave rectification by diodes $D_1 \ldots D_6$, comparisons between the input voltages of respective phases are made. Thus, considering the half cycle of a phase voltage, power is delivered to the load only for the range of $\frac{2}{3}$ when the voltage is higher than in the other two phases. As a result, the line current wave form I from the 3 phase power source takes the form of a quiescent $\frac{1}{3}\pi$ radian period and conducting $\frac{2}{3}\pi$ radian periods during the half cycle, as shown in FIG. 2. The distortion factor of this current I, as actually measured, shows as high a value as 27%. A large distortion factor means a large high harmonic component, which naturally results in increased loss in the transformer. In the 3 phase power source, the secondary output is delta-connected which causes a short-circuiting current caused by the third high harmonic to flow, thereby further increasing loss. For this reason, the efficiency of the power supply transformer declines, permitting only a smaller power than initially designed to be delivered to a load. Conversely, to achieve a desired power output requires a power supply larger than is necessary, which is uneconomical. Since the loss which occurs inside the transformer is mostly converted into heat, the service life of the transformer is shortened. If the transformer is designed for higher heat resistance, an increase in cost results.

As an alternative, a power supply system like that described in U.S. Pat. No. 4,143,414 has been proposed. In this system, to each phase of the 3 phase AC power source, is joined an AC-DC converter composed of a first rectifier, a DC-AC converter and a second rectifier, all connected in series, and the output is delivered by connecting the DC ouputs from respective converters in parallel. Even in this system, voltage comparison is performed because respective second rectifiers are connected in parallel at the final DC output stage. Consequently, an input current quiescent period is produced on the 3 phase AC side, resulting in a higher distortion factor. Thus this system involves a similar deficiency as was involved in the prior art power supply system first described.

The present invention has been designed to overcome the above-mentioned difficulty. Thus, an object of the invention is the provision of a power supply system which obtains at its output a high frequency power with nearly constant amplitude. This is accomplished by inverting the power in a plurality of AC phases into a high frequency power and superposing each in series. In this way, the line current distortion of the 3 phase power source is greatly reduced, thereby attaining smaller loss and a reduction in overall size of the system and higher operating efficiency.

This invention, as well as its features and advantages, will become more apparent from the following description taken with reference to the drawings showing the operation principles and various embodiments.

DETAILED DESCRIPTION OF THE INVENTION

Figure 1:
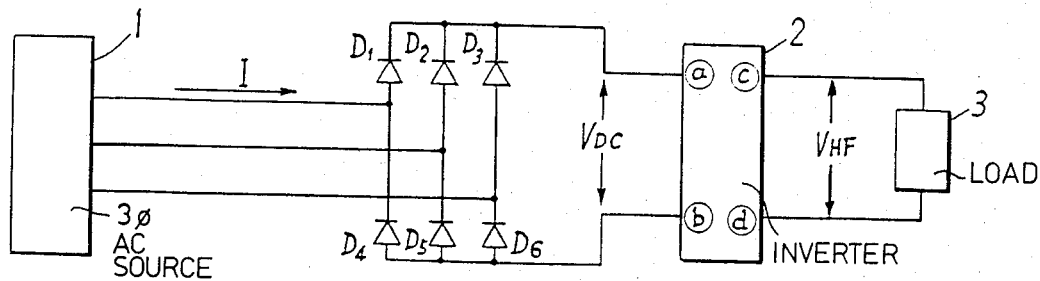
FIG. 1 illustrates a circuit of a conventional power supply system.
Figure 2:
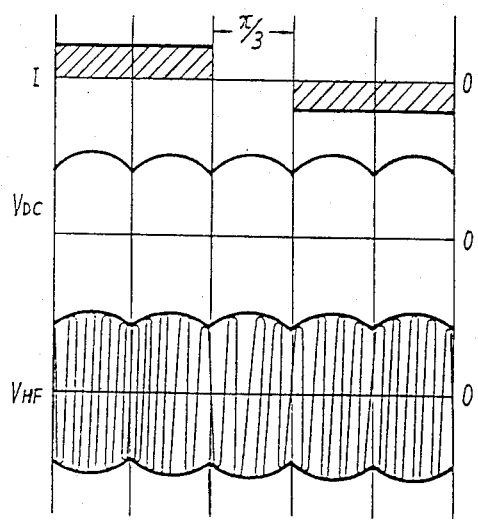
FIGS. 2 and 3 are drawings which explain the FIG. 1 system.
Figure 3:
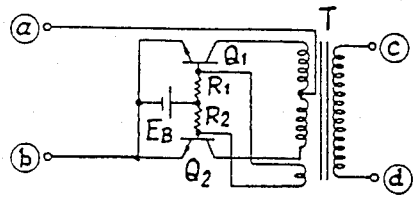
Figure 4:
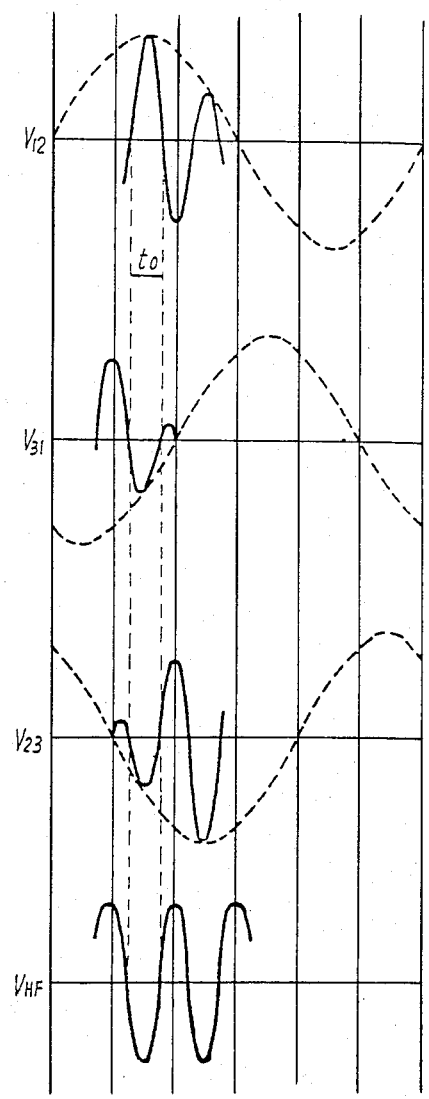
FIG. 4 is a graph explaining the operation principle of the invention.

FIG. 4 shows graphs depicting the operation principle of the invention. $V_{12}$, $V_{31}$ and $V_{23}$ shown by broken lines denote, respectively, voltages of a 3 phase AC power source represented by sine waves differing 120 degrees ($\frac{2}{3}\pi$ radians) in phase. As a characteristic feature of 3 phase alternating current, the sum of the powers in all phases at every instant is always constant and thus not time-dependent. For example, in commercial products, which make use of symmetrical 3 phase alternating current, the power is represented by $P = 3EI \cos\psi$, assuming that the effective values of the ring voltage and ring current are E and I and the power factor is $\cos\psi$ when the load is in ring connection. Thus a constant power can be supplied to the load while keeping the AC input currents of the 3 phase power source in sine wave form. With a single phase power source, the original power undergoes a change in the sine wave form and this makes it impossible to provide the load with a constant power while curtailing AC input current distortion. The 3 phase full wave rectifying system illustrated as prior art above does not embody use of the feature of constant sum of the powers and thus produces larger distortions of AC input currents.

In order to make the feature of the 3 phase power source available, it is necessary to provide the respective powers of the three phases of the alternating current in superposable form, but if they are superposed in the state of 3 phases, for example, when only a transformer is connected to each phase and the output sides of the 3 transformers are superposed in series, the sum of the voltages will become 0, resulting in inability to supply power to the load. Accordingly, in the present invention the superposition of respective powers is accomplished by inverting each of the 3 phase AC voltages into a high frequency wave and then superposing the high frequency wave.

As shown in FIG. 4, respective 3 phase AC voltages are converted to respective high frequency waves, all of which have the same frequency and the same zero cross point in time, with the high frequency waves being superposed. The high frequency waves corresponding to the voltages $V_{23}$ and $V_{31}$ of this example are in phase and the high frequency wave corresponding to the voltage $V_{12}$ differs 180 degrees in phase from $V_{23}$ and $V_{31}$. Thus over a span of time $t_0$, there exist only two types of voltages, one positive the other negative. It is simple to superpose two alternating currents differing 180 degrees in phase after bringing them into phase. One way this would be done is by merely alternating the connection on the secondary side of the transformer, if used for this purpose. Accordingly, it becomes possible to superpose respective 3 phase AC powers in series, enabling the production of a high frequency power output having an amplitude which is constant over time. The constant amplitude results from the inversion of respective three phases of the AC power into high frequency waves which are superposed which achieves the objective of obtaining constant power. This process is identical to converting 3 phase AC power to a constant power independently of time and, thereafter inverting it to a high frequency power without modification, these two operations being performed at once. Thus the method used in the invention permits the AC input current distortion to be greatly curtailed.

Figure 5:
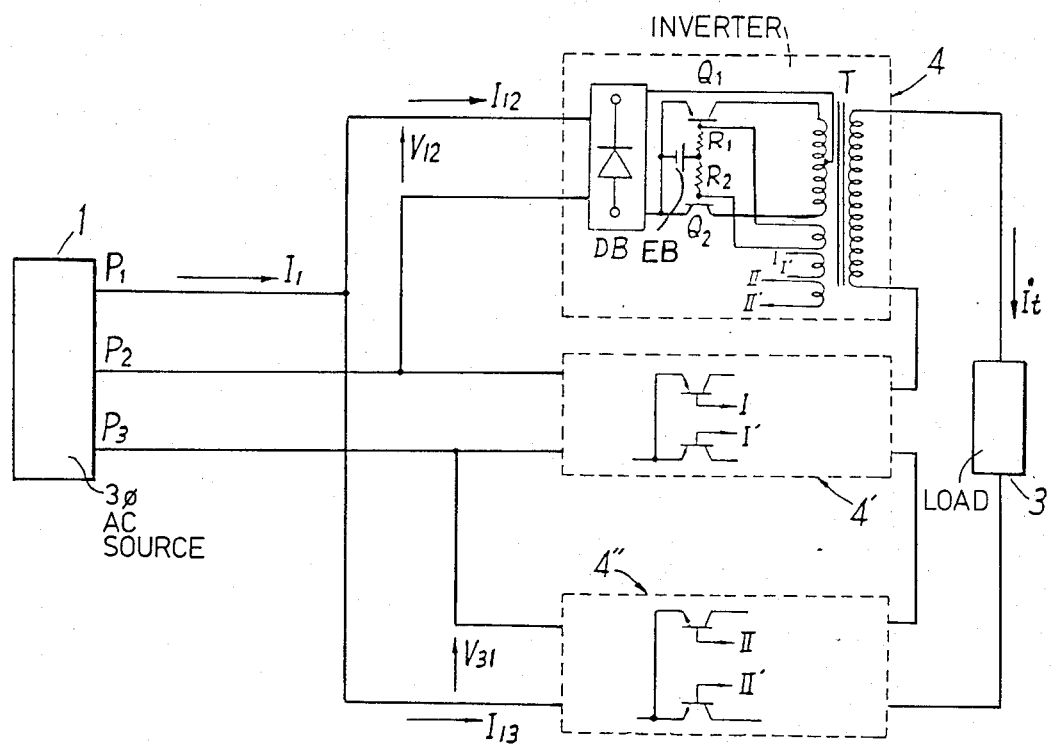
FIG. 5 is a schematic representation of a first embodiment of this invention.

FIG. 5 illustrates a first embodiment of this invention, in which the aforementioned operation principle has been embodied in a physical circuit. Describing this circuit with reference to FIG. 5, an inverter 4 is connected across lines P1 and P2 of a 3 phase power source, the inverter 4 being composed of a rectifier DB, like transistor switching elements Q1 and Q2, an output transformer T, a power source $E_B$ for providing control current for the switching elements, and resistances $R_1$ and $R_2$. Inverters 4' and 4" are similarly connected across lines P2 and P3, P3 and P1. The secondary sides of the output transformers of the respective inverters are connected in series, thereby providing power to the load 3. The inverter 4 is used also as the control to equalize the oscillation frequency of the respective inverters and to make the zero crossing points of the high frequency waves produced by the respective inverters occur at the same time. Accordingly, all the switching signals for the transistors of the inverters 4, 4' and 4" are taken from the inverter 4 and are applied to control terminals of switching elements of the inverters. The high frequency waves shown in FIG. 4 are produced at the output of the switching transistors of the various inverters. If the connections of the secondary side of the transformers T are suitably connected, a series connection can be achieved in which all high frequency waves are in phase.

A description of the operation of the FIG. 5 circuit follows. The inverter 4 is self-excited, but the inverters 4' and 4" are separately excited. Thus as the inverter 4 is being self-excited, exactly the same signal which is turning the switching elements of inverter 4 on and off is produced on windings I, I' and II, II'. Since each of these windings is linked to the control terminal of the switching elements of inverter 4' and 4", these inverters will oscillate with the same frequency and timing as the inverter 4, enabling the inverters to have respective high frequency output waves which all have the same frequency and zero cross point timing as discussed earlier with reference to FIG. 4.

Figure 6:
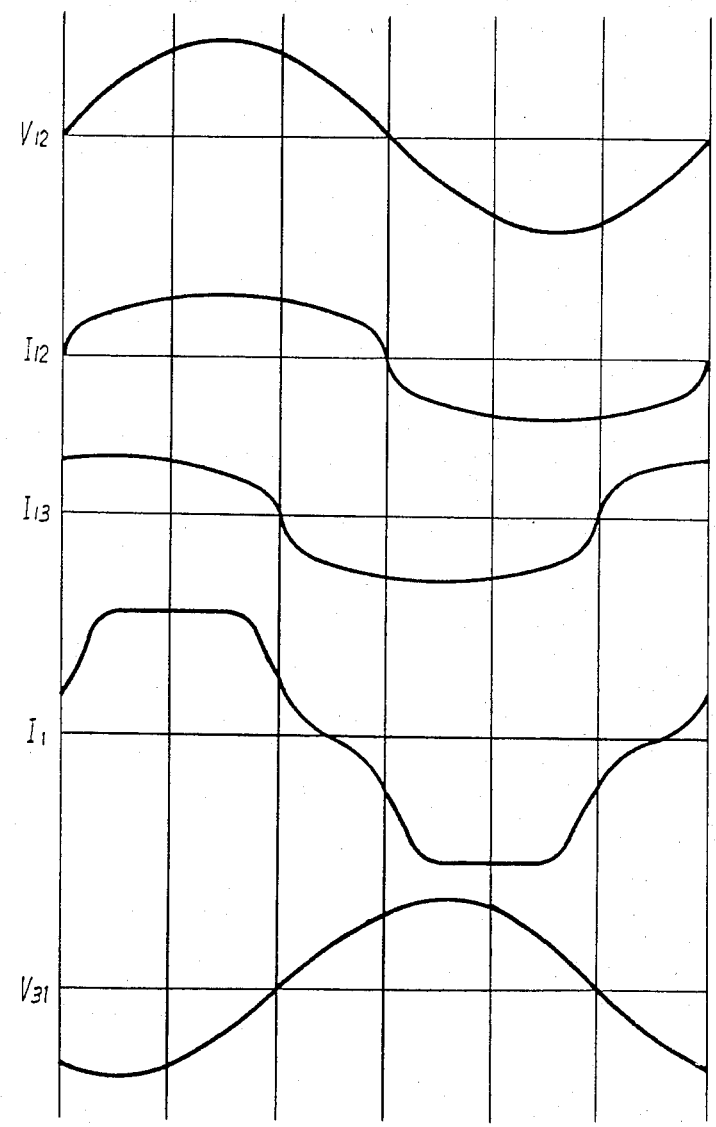
FIG. 6 is a graph explaining operation of the FIG. 5 circuit.

FIG. 6 illustrates the operation wave forms for the FIG. 5 circuit, showing that a current I12 in phase with the voltage V12 across lines P1 and P2 flows in the inverter 4. Similarly, a current I13 in phase with the voltage V31 flows in inverter 4" and the line current I1 is, then, represented by the sum of these currents I12 and I13. The distortion factor of the line current I1 is, for example, 9%, which corresponds to $\frac{1}{3}$ of the distortion which exists in prior art systems, and it is verifiable that this factor can be reduced to as little as 3% by utilizing oscillating type inverters. Other line currents I2 and I3 have the identical form and a phase difference of 120 degrees, respectively. They are capable of supplying the load 3 with a high frequency power with a constant amplitude.

Figure 7:
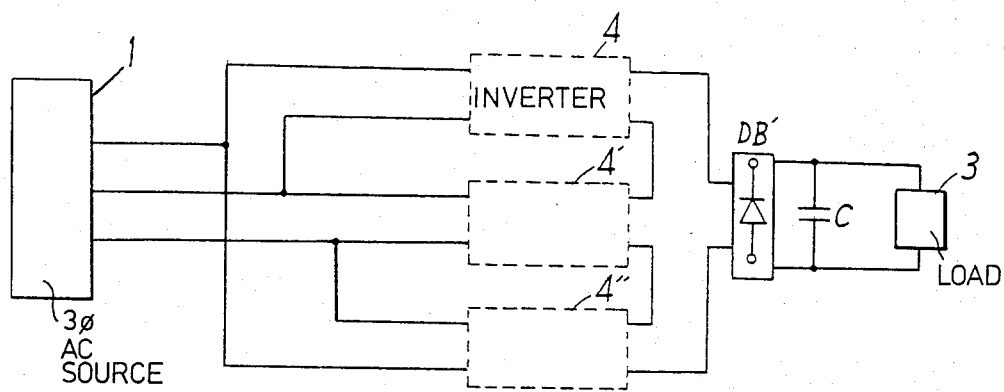
FIG. 7 is a schematic representation of a second embodiment of the invention.

FIG. 7 illustrates a second embodiment of this invention in which the outputs from inverters 4, 4' and 4" are superposed in series and then rectified by a rectifier DB' and smoothed with a condenser C, yielding a DC power. In this arrangement the superposed high frequency voltage provides an instantaneous power which is constant independent of time with a constant amplitude and, therefore, only small capacitance is required of the condenser for smoothing. As in the first embodiment shown in FIG. 5, the AC input current distortion is small. For this reason, reduction of loss in the power supply transformer, miniaturization of the whole system and a high efficiency can be achieved.

Figure 8:
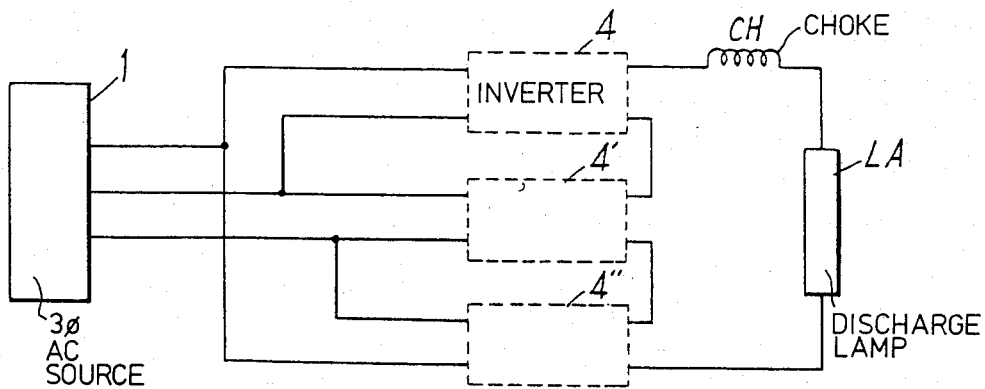
FIG. 8 illustrates the application of the present invention to a load comprising a discharge lamp lighting fixture.

FIG. 8 shows a power supply system of this invention used with a discharge lamp lighting fixture having a series-connected circuit of a choke coil CH and a discharge lamp LA connected as a load. When a discharge lamp lighting fixture uses an inverter as a single phase power source, the AC input current distortion was found to be on the order of 30%, showing a large adverse effect due to distortion. Although it is desirable to keep the amplitude of the high frequency wave constant by using a DC power source in order to elevate the luminous efficiency and thereby achieve a power saving, rectifying and smoothing circuits are necessary to obtain direct current from a single phase power source and the input current will have quiescent time, as described earlier, further creating distortion. That is to say, elevating the luminous efficiency of a discharge lamp, while reducing the AC input current distortion, was impossible with single phase power sources. According to the embodiment of this invention, which enables a high frequency wave to be obtained with a constant amplitude and reduced AC input current distortion, the luminous efficiency of a discharge lamp can be increased and a power saving achieved. In addition, by providing the output transformers inside the inverters 4, 4' and 4" with a magnetic leakage effect, the choke coil CH may be omitted.

As described hereinabove, with the power supply system of this invention equipped with high frequency power inverters for inverting the power in respective phases of a 3 phase power source into high frequency waves and superposing these waves in series with the proper oscillation timings, it is not only possible to make the AC input current distortions very small, but also to obtain a constant power at the output, consequently achieving high efficiency, miniaturization of components and a reduced cost for the power supply transformers. In addition, a significant reduction in noise to the supply lines and reduction or elimination of interference with other equipment may be attained.

Although the foregoing description has been specific to a 3 phase power source as input, it should be appreciated that this invention is applicable in general to polyphase AC voltage inputs.

Moreover, other variants may be made without departing from the spirit and scope of the invention. Accordingly, the foregoing description is merely exemplary of the invention and does not limit it, the invention being defined by the appended claims.

What is claimed is:

1. A power supply system comprising:
   a source providing three phase AC power at a predetermined frequency, said source having output lines respectively corresponding to each of the phases of said AC power;
   a plurality of rectifiers connected to respective pairs of said output lines;
   a plurality of inverters each connected to an output of a respective one of said rectifiers and comprising an oscillation circuit, each said inverter providing by means of said oscillation circuit an oscillating output signal at a predetermined higher frequency than said predetermined frequency, the output signals of all of said inverters being at the same predetermined higher frequency;
   a control means for operating the oscillation circuits of said inverters, said control means synchronizing the oscillation period of the oscillation circuits of the inverters such that the output signals of said inverters have the same zero cross point timing;
   means connected to the outputs of said inverters for superposing in series and phase the outputs of said inverters to produce a high frequency power source.

2. A power supply system as in claim 1 further comprising:
   a rectifying circuit connected to the output of said superposing means; and,
   a smoothing circuit connected to the output of said rectifying circuit.

* * * * *